United States Patent
Lee et al.

(10) Patent No.: US 10,468,914 B2
(45) Date of Patent: Nov. 5, 2019

(54) CONTACTLESS POWER TRANSFER SYSTEM

(71) Applicant: Robert Bosch GmbH, Stuttgart (DE)

(72) Inventors: Huang Lee, Mountain View, CA (US); Martin Coors, Mountain View, CA (US); Vivek Jain, Mountain View, CA (US); Abtin Keshavarzian, Mountain View, CA (US); Horace Arlen Olive, Jr., Santa Clara, CA (US); Murat Senel, San Mateo, CA (US); Lakshmi Venkatraman, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 1835 days.

(21) Appl. No.: 13/792,818

(22) Filed: Mar. 11, 2013

(65) Prior Publication Data
US 2014/0252813 A1    Sep. 11, 2014

(51) Int. Cl.
*B60N 2/00*   (2006.01)
*H02J 50/12*  (2016.01)
(Continued)

(52) U.S. Cl.
CPC .............. *H02J 50/12* (2016.02); *H02J 7/025* (2013.01); *H02J 17/00* (2013.01); *H02J 50/20* (2016.02);
(Continued)

(58) Field of Classification Search
CPC . H02J 17/00; H02J 5/005; H02J 7/025; H04B 5/0075; B60N 2002/0264;
(Continued)

(56) References Cited

U.S. PATENT DOCUMENTS 5,696,409 A * 12/1997 Handman ............ B60N 2/0224
                                                307/10.1
5,890,779 A *  4/1999 Blackburn ........... B60N 2/0224
                                                307/10.1
(Continued)

FOREIGN PATENT DOCUMENTS

| GB | 2327914 A | 10/1999 |
|---|---|---|
| KR | 10-2012-0048306 A | 5/2012 |
| WO | 2010106636 A1 | 9/2010 |

OTHER PUBLICATIONS

International Search Report and Written Opinion corresponding to PCT Application No. PCT/US2014/021633, dated Jun. 24, 2014 (14 pages).

(Continued)

*Primary Examiner* — Thienvu V Tran
*Assistant Examiner* — Brian K Baxter
(74) *Attorney, Agent, or Firm* — Maginot Moore & Beck LLP

(57) ABSTRACT

A system for powering components in a vehicle seat enables electronic components within the vehicle seat to receive power without wires connecting the seat to a vehicle body. The system includes a power transmitter that generates an electromagnetic field, and a power receiver located within the vehicle seat and the electromagnetic field. The power receiver is configured to generate electrical power from the electromagnetic field and deliver the power to at least one component in the vehicle seat.

7 Claims, 5 Drawing Sheets

(51) Int. Cl.
*H02J 17/00* (2006.01)
*H02J 7/02* (2016.01)
*H04B 5/00* (2006.01)
*H02J 50/40* (2016.01)
*H02J 50/20* (2016.01)
*B60N 2/02* (2006.01)

(52) U.S. Cl.
CPC ............ *H02J 50/40* (2016.02); *H04B 5/0075* (2013.01); *B60N 2002/0264* (2013.01)

(58) Field of Classification Search
CPC ........ H01F 38/14; B60L 11/182; B60L 11/14; Y02T 10/7005; Y02T 10/7077; B60R 16/03; B60R 16/0315
USPC .................................................. 307/104, 9.1
See application file for complete search history.

(56) References Cited

U.S. PATENT DOCUMENTS

| | | | |
|---|---|---|---|
| 6,084,317 A | 7/2000 | Wolfe et al. | |
| 6,169,339 B1 | 1/2001 | Cripe | |
| 6,400,259 B1* | 6/2002 | Bourcart | B60N 2/002 340/425.5 |
| 6,800,958 B1* | 10/2004 | Baer | B60R 16/027 307/10.1 |
| 7,667,603 B2 | 2/2010 | Bolander et al. | |
| 7,679,491 B2 | 3/2010 | Costello et al. | |
| 7,719,408 B2 | 5/2010 | DeWard et al. | |
| 8,060,282 B2 | 11/2011 | Breed | |
| 8,115,448 B2 | 2/2012 | John | |
| 8,430,451 B1* | 4/2013 | Heinz | B60N 2/286 297/180.12 |
| 9,318,922 B2* | 4/2016 | Hall | B60L 1/00 |
| 2006/0139159 A1* | 6/2006 | Lee | B60N 2/002 340/457 |
| 2007/0191075 A1* | 8/2007 | Greene | H02J 17/00 455/572 |
| 2007/0221428 A1* | 9/2007 | Strutz | B60R 22/48 180/268 |
| 2008/0054638 A1* | 3/2008 | Greene | H02J 17/00 290/1 R |
| 2008/0319616 A1* | 12/2008 | Federspiel | B60R 21/01526 701/45 |
| 2009/0082705 A1* | 3/2009 | Asfora | A61H 19/00 601/46 |
| 2010/0201189 A1* | 8/2010 | Kirby | H04B 5/0037 307/9.1 |
| 2010/0213895 A1 | 8/2010 | Keating et al. | |
| 2010/0277121 A1 | 11/2010 | Hall et al. | |
| 2011/0029156 A1 | 2/2011 | Vernacchia et al. | |
| 2011/0054694 A1 | 3/2011 | Munk | |
| 2011/0062916 A1* | 3/2011 | Farahani | H01Q 1/248 320/108 |
| 2011/0140671 A1 | 6/2011 | Kim et al. | |
| 2012/0019057 A9* | 1/2012 | Kirby | H04B 5/0037 307/9.1 |
| 2012/0303980 A1 | 11/2012 | Culbert et al. | |
| 2013/0005251 A1 | 1/2013 | Soar | |
| 2013/0009488 A1* | 1/2013 | Choe | H02J 5/005 307/104 |
| 2013/0013026 A1* | 1/2013 | Hoyer | A61N 1/37223 607/49 |
| 2013/0221744 A1* | 8/2013 | Hall | H02J 7/00 307/9.1 |
| 2014/0241555 A1* | 8/2014 | Terlizzi | H04B 5/0006 381/315 |
| 2015/0048752 A1* | 2/2015 | Van Den Brink | H02J 5/005 315/246 |
| 2016/0221441 A1* | 8/2016 | Hall | B60L 1/00 |

OTHER PUBLICATIONS

Supplementary European Search Report corresponding to European Patent Application No. 14 77 9149 (2 pages).

* cited by examiner

CONTACTLESS POWER TRANSFER SYSTEM

TECHNICAL FIELD

This disclosure relates generally to power transfer, and, more particularly, to contactless power transfer.

BACKGROUND

Modern devices often include many electronic components and parts. Some electronic components within these devices need to be tested prior to initial assembly or before integration into a final product to ensure that the electronics do not have manufacturing defects that may result in faulty operation of the finished product. Testing electronic components requires a connection to a power source. In some instances, a power source, such as a battery or a connection to a wall outlet, is not installed until late in the assembly or after the product is completed. Consequently, testing electronic components prior to integration into the finished product may require installation of temporary wiring to connect the electronic components to a power source, which can be cumbersome and costly.

In some situations, the added difficulty of testing the electronic components results in a manufacturer waiting to test the electronics in the device until completion of the finished product. However, if an electronic component is then found to be defective, repairing or replacing the defective component can be difficult, requiring added labor to disassemble the product or necessitating spoiling the entire finished product. Repairing or replacing defective electronic components after a product if finished or spoiling an entire finished product is costly and inefficient.

Typically, to test electronic components in a device during production, the device or the electronic components therein are temporarily connected to a power source by wires. The wired power source delivers power to the electronic devices, which can then be tested for functionality. However, temporarily wiring an unfinished device to test electronic components therein requires labor to connect and remove the temporary wiring, increasing the cost of producing the device.

Modern vehicles are typically manufactured on an assembly line. During assembly, numerous electronic components and parts, such as sensors, motors, lights, and controls, are installed throughout the vehicle. Many of these devices need to be tested to ensure proper operation prior to installation of the vehicle power source. One solution to testing electronic components in vehicles during assembly is to install temporary wiring and cabling to connect a source of electrical power to each electronic component within the vehicle. Again, however, the installation of temporary wiring and cabling is costly and labor intensive. Another solution is to delay testing the components until after the battery is installed in the vehicle. Some electronic components, however, may be difficult and expensive to replace if a defect is not detected until after the battery is installed.

Furthermore, the many electronic components in a vehicle require power to function during normal operation of the vehicle. Some of these electronic devices are located distant from the power source of the vehicle, which is typically the vehicle battery. Consequently, numerous power cables must extend from the battery to connect it to each of the electronic components in the vehicle. Additionally, various electronic components in the vehicle are located in parts of the vehicle that move in relation to the vehicle body. As a result, the cables and wires connecting these components to the battery are complex and susceptible to failure from repeated movement of the parts or being pinched between moving parts.

What is needed, therefore, are improvements in power delivery to electronic components during assembly and in power delivery to electronic components in vehicles to reduce difficulties from connecting the electronic components to a power source by cables.

SUMMARY

In one embodiment, a system for powering components in a vehicle seat enables electronic components within the vehicle seat to receive power without wires connecting the seat to a vehicle body. The system includes a vehicle body, a power transmitter, a seat, and a power receiver. The power transmitter is supported by the vehicle body and operatively connected to a vehicle power supply, and is configured to generate an electromagnetic field. The seat is supported by the vehicle body and the power receiver is located in the seat within the electromagnetic field. The power receiver is operatively connected to at least one component in the seat, and is configured to generate electrical power from the electromagnetic field and deliver the electrical power to the at least one component.

In another embodiment, a vehicle includes a seat that is powered by a wireless power system. The vehicle includes a power source, a power transmitter, and a seat. The power transmitter is operatively connected to the power source to receive electrical energy from the power source and configured to generate an electromagnetic field. The seat has a power receiver located within the electromagnetic field and configured to generate electrical power from the electromagnetic field. Additionally, the seat includes at least one component operatively connected to the power receiver to receive the electrical power generated by the power receiver.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
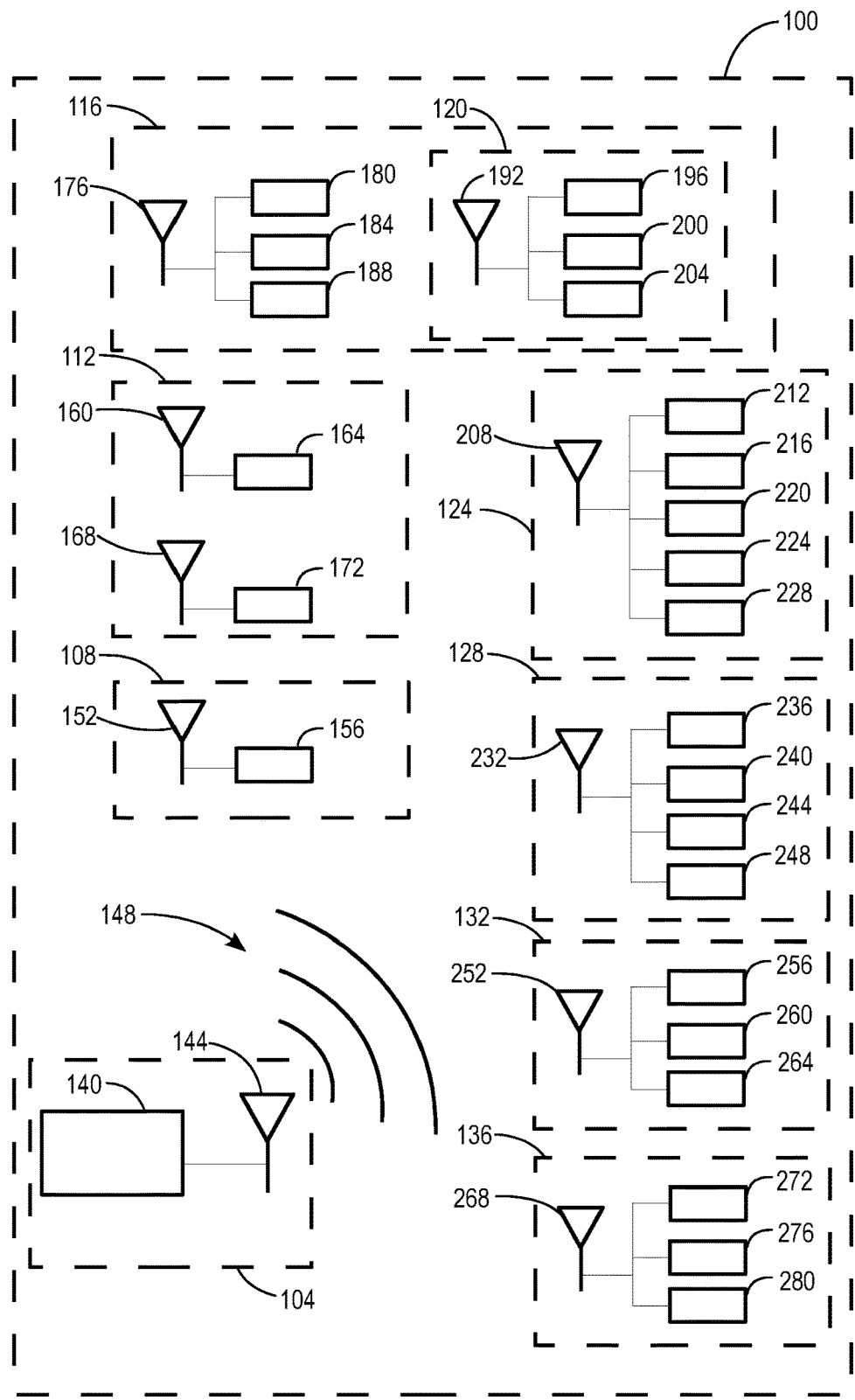
FIG. 1 is a schematic diagram of a vehicle equipped with a contactless power transfer system.

FIG. 1 depicts a schematic diagram of a contactless power system for a vehicle 100. The system includes a power transmission system 104, a wheel system 108, an exterior lighting and video system 112, a door system 116 having a wing mirror system 120, a power seat system 124, a roof system 128, a steering wheel system 132, and a hatch or trunk system 136. The power transmission system 104 has a power source or an energy storage system 140, for example one or more of a battery, an alternator, a solar panel, etc., that is operatively connected to a power transmitter 144 configured to generate an electromagnetic field 148. The power transmitter 144 in different embodiments is a near-field resonant inductive coil, a near-field non-resonant inductive coil, a far-field radio-frequency ("RF") antenna, a resonant magnetic element, and a light source. In various embodiments, the power transmission system can include one or more of the above transmitters, and can include a mixture of types of transmitters to transmit power to different of the power receiving systems.

The wheel system 108 of the vehicle includes a power receiver 152 operatively connected to a sensor 156, which is for example an air pressure sensor for a tire. The power receiver 152 is configured to be positioned within the electromagnetic field 148 generated by the power transmitter 144 such that the electromagnetic field 148 acts on the power receiver 152. The power receiver 152 is configured to receive energy from the electromagnetic field 148, and is therefore matched to the type of energy generated by the power transmitter 144. For example, a power receiver in a system having a power transmitter that is an inductive coil generating a near-field resonant electromagnetic field will be a corresponding inductive coil configured to resonate in the presence of the electromagnetic field. Likewise, in a system where the power transmitter is a far-field RF antenna, the power receiver is also a far-field RF antenna configured to receive the energy transmitted by the RF transmitting antenna. In some embodiments, the power transmitter is a magnetic element and the power receiver is also a magnetic element configured to receive the energy transmitted by the magnetic element of the power transmitter. A system in which the power transmitter is a light source will be configured with a solar receptor as the power receiver. The power receiver 152 generates electric power from the energy received from the electromagnetic field 148 and delivers the generated electric power to the sensor 156 to enable the sensor 156 to operate to measure air pressure in a tire of the vehicle. Consequently, the air pressure sensor 156 can be designed without a battery, extending the usable life of the sensor 156. The signal generated by the sensor 156 indicating the air pressure in the tire is delivered to a controller in the vehicle via a known wireless signal transmission standard, such as Bluetooth, WiFi, Zigbee, or RF signal transmission, enabling the sensor to be installed free of wired connections.

The exterior light and video system 112 of the vehicle 100 includes a power receiver 160 operatively connected to exterior lights 164 of the vehicle 100, for example headlights, taillights, brake lights, or turn signals, and another power receiver 168 operatively connected to a video camera, a proximity sensor, a motion sensor 172, or combination thereof. The power receivers 160 and 168 are each located within the electromagnetic field 148 and, as described above, correspond to the type of energy transmitted by the power transmitter 144 to enable the power receivers 160 and 168 to receive energy from the electromagnetic field 148. The power receivers 160 and 168 transform the energy received from the electromagnetic field 148 into usable electrical power to power the exterior lights 164 and the camera or proximity sensor 172, respectively, enabling operation of the exterior lights 164 and the camera or sensor 172. The camera or sensor 172 can be further configured to wirelessly transmit the video or sensor signals generated, thus enabling the camera or sensor to be installed without any wiring. Wirelessly powered cameras or sensors can therefore be installed after the vehicle is manufactured without necessitating costly and complex wiring to connect the newly added parts.

The door system 116 of the vehicle 100 includes the wing mirror system 120, a power receiver 176 operatively connected to door locks 180, a window motor 184, and lights 188. The power receiver 176 in the door 116 is configured similarly to the power receivers 152 and 160 discussed above to generate electric power from the electromagnetic field 148 and deliver the electric power to the locks 180, window motor 184, and lights 188 to power the door locks 180, window motor 184, and lights 188. Powering the components in the door by contactless power transfer eliminates the need for complex wiring to connect the electronic components in the movable door.

The wing mirror system 120 is also equipped with a wireless power receiver 192 that generates power from energy received from the electromagnetic field 148. The power receiver 192 is operatively connected to lights 196, for example mirror-mounted turn signals, sensors 200, such as a blind-spot proximity sensor, and a motor 204 for adjusting the position of the wing mirror. The power generated by the receiver 192 enables operation of the lights 196, sensors 200, and motor 204 in the wing mirror system 120. Since the wing mirror system 120 does not have wired connections to the vehicle 100, the wing mirror system 120 is easy to replace in the event that the mirrors become damaged or custom mirrors are desired. In some embodiments, the wing mirror system is separate from the door system, for example on a vehicle where the mirrors are mounted on the vehicle body rather than the door. In other embodiments, the wing mirror system can be configured to receive power directly from the power receiver of the door system and, as such, does not include a separate power receiver.

The seat system 124 of the vehicle 100 has a power receiver 208 operatively connected to a seat motor 212, a seat heater 216, one or more sensors 220, seat controls 224, and one or more peripheral connections 228. The power receiver 208 receives energy from the electromagnetic field 148 generated by the power transmitter 144 and produces usable electric power from the received energy. The power produced by the receiver 208 powers the motor 212 to move various parts of the seat system 124 to enhance user comfort, the heater 216 to warm the seat, the sensors 220 to generate a signal indicative of the presence of a user in the seat, the controls 224 to control the operation of the motor 212 and heater 216, and peripheral connections 228 to enable a user to power peripheral devices from the seat. The seat system 124 is therefore configured such that all of the components therein requiring electricity are powered by the power receiver 208. Consequently, the seat does not require a wired power connection to power the seat components. As a result, designing the seat system 124 to be movable to accommodate a user comfort is simple and cost-effective. Furthermore, the sensors 220 can be configured with wireless signal transmitters, using known signal transmission methods such as Bluetooth, Wifi, Zigbee, or RF signal transmission, to enable the seat system 124 to be designed with no signal or power cables connecting the vehicle body to the seat system 124. Thus, installation of the seat system 124 is simple, enabling easy user replacement and customization.

The roof system 128 of the vehicle 100 supports another power receiver 232 configured to generate power from the electromagnetic field 148 produced by the power transmitter 144. The roof power receiver 232 is operatively connected to one or more lights 236, for example an interior dome light, a rear-view mirror 240 having lights or electronic features, a motor 244 configured to open and close a sunroof or moonroof in the vehicle 100, and controls 248 to operate various electronics in the vehicle, such as the sunroof, moonroof, or interior lights. Operating the various electronics components in the roof system 128 of the vehicle 100 by contactless power eliminates the need for cables and wires connecting power to the roof, simplifying and reducing the cost of manufacturing the vehicle 100. Furthermore, a rear-view mirror installed with contactless power can be easily replaced and customized by a consumer after the vehicle is produced.

The vehicle 100 includes another wireless power receiver 252 installed in the steering wheel system 132. The wireless power receiver 252 in the steering wheel system 132 is operatively connected to various controls 256 in the wheel operating, for example, a cruise control system, a radio, a navigation system, or a cellular phone electronically or wirelessly connected to the vehicle. The power receiver 252 is also operatively connected to lights 260 in the steering wheel system 132, and sensors 264 in the wheel that can detect the rotational position of the steering wheel. The wireless power receiver 252 in the steering wheel system 132 is positioned in the electromagnetic field 148 and is configured to generate electrical power from energy received from the electromagnetic field 148. The power generated by the receiver 252 powers the controls 256, lights 260, and sensors 264. In some embodiments, the steering wheel system includes a heater powered by the wireless power receiver to warm the steering wheel. Wirelessly powering the electronic components in the steering wheel system 132 enables the controls 256, lights 260, and sensors 264 installed therein to be quickly and easily changed by a dealer or a consumer after the vehicle is manufactured to customize the wheel to a user's preference.

The hatch or trunk system 136 of the vehicle includes yet another wireless power receiver 268. The wireless power receiver 268 of the hatch or trunk system 136 is operatively connected to a defroster 272 for heating the rear window of the vehicle 100, a motor 276 that can operate a rear wiper or an opening mechanism for the hatch or trunk system 136, and lights 280 such as high-mount brake lights or interior trunk lights. The wireless power receiver 268 in the trunk generates electricity from the electromagnetic field 148 to power the defroster 272, the motor 276, and the lights 280, eliminating the need for wiring extending from the battery through the vehicle to the rear portion and wiring connected to moving parts of the hatch or trunk system 136.

Although the above vehicle 100 is described using a single power transmitter 144, the reader should appreciate that multiple wireless power transmitters 144 can be installed in the vehicle at various locations to facilitate simple wiring and transfer of power between remote and moving components. The power transmitters can be different types of power transmitters, for example far-field RF transmitters to operate the remote components, such as sensors, requiring small amounts of power, and near-field inductive transmitters positioned near components, such as motors and heaters, that require larger amounts of power. Furthermore, any of the power receivers can be operatively connected to an additional power transmitter to retransmit power generated by the power receiver, effectively extending the range of the power transmission system. Additionally, any of the systems in the vehicle can be configured with more than one power receiver, or more than one type of power receiver, to simplify transfer of power to the devices within the system.

Figure 2:
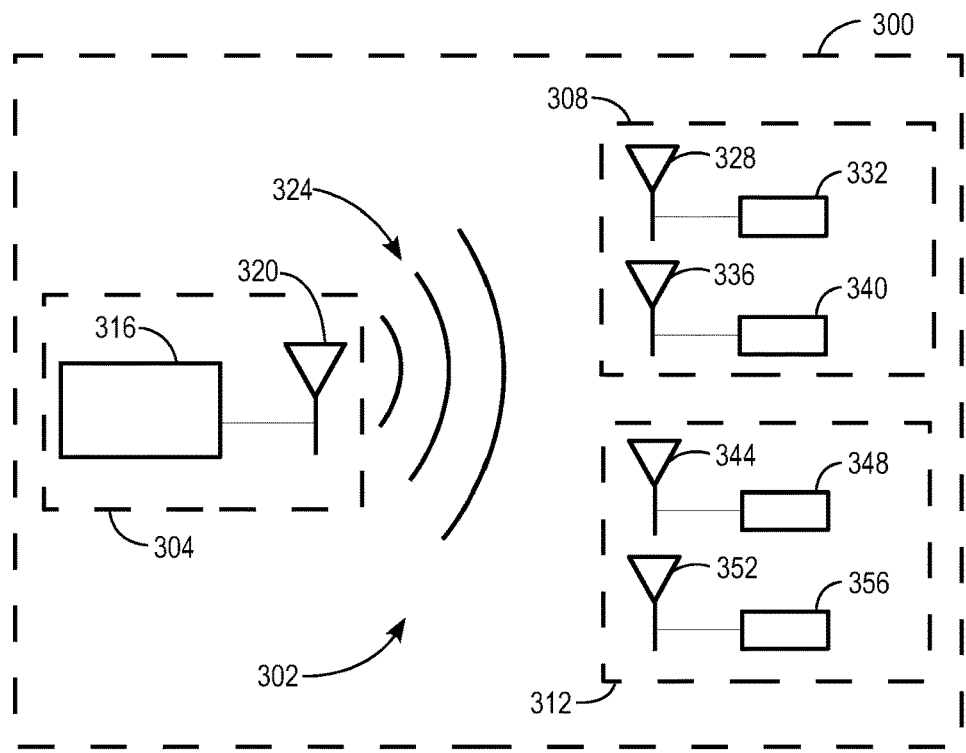
FIG. 2 is a schematic diagram of another vehicle equipped with a contactless power transfer system.

FIG. 2 illustrates another vehicle 300 having a contactless power system 302. The vehicle 300 includes a wireless power transmission system 304, a first seat 308, and a second seat 312. The power transmission system 304 has an energy storage system such as a battery 316 operatively connected to a far-field RF power transmitting antenna 320. The RF transmitting antenna 320 is configured to generate an electromagnetic field 324 encompassing at least a portion of the seats 308 and 312 of the vehicle 300.

The first seat 308 has a first far-field RF power receiving antenna 328 operatively connected to a sensor 332, and a second far-field RF power receiving antenna 336 operatively connected to controls 340 in the seat 308. Each of the receiving antennas 328 and 336 is located within and configured to receive energy from the electromagnetic field 324 and convert the received energy into usable power. The receiving antennas 328 and 336 can be any suitable antenna that receives energy from the RF electromagnetic field 324, for example a dipole antenna, a patch antenna, or a loop antenna. The usable power generated by the receiving antenna 328 is delivered to the sensor 332 to power the sensor 332, while the usable power generated by the receiving antenna 336 powers the controls 340. In one embodiment, the first power receiver 328 is integral with the sensor 332 to enable simple installation and replacement of the sensor 332 and power receiver 328. Likewise, the second power receiver 336 can be integral within a housing of the controls 340.

The second seat 312 in the vehicle 300 is configured substantially the same as the first seat 308. The second seat 312 has two far-field RF power receiving antennas 344 and 352, which are operatively connected to a sensor 348 and controls 356, respectively. The receiving antenna 344 receives energy from the electromagnetic field 324 and converts the energy into usable power to enable operation of the sensor 348. Likewise, the receiving antenna 352 converts energy from the electromagnetic field 324 into usable power to operate the controls 356. As described above, in one embodiment, the power receiving antenna 344 can be integral with the sensor 348, while the power receiving antenna 352 can be integral with the controls 356.

In the embodiment of FIG. 2, the wireless power system 302 operates only sensors 332 and 348 and controls 340 and 356, which require minimal amounts of power. Since the amount of energy needed by the sensors 332 and 348 and the controls 340 and 356 are small, the RF power transmitting antenna 320 can be positioned at a location within the vehicle 300 that is convenient for connecting the transmitting antenna 320 to the power source 316. The power transmitting antenna 320 is configured to generate an electromagnetic field 324 that encompasses a large portion of the vehicle 300 and is powerful enough to enable the power receiving antennas 328, 336, 344, and 352 to generate sufficient electricity from the field 324 to power the sensors 332 and 348 and controls 340 and 356.

Figure 3:
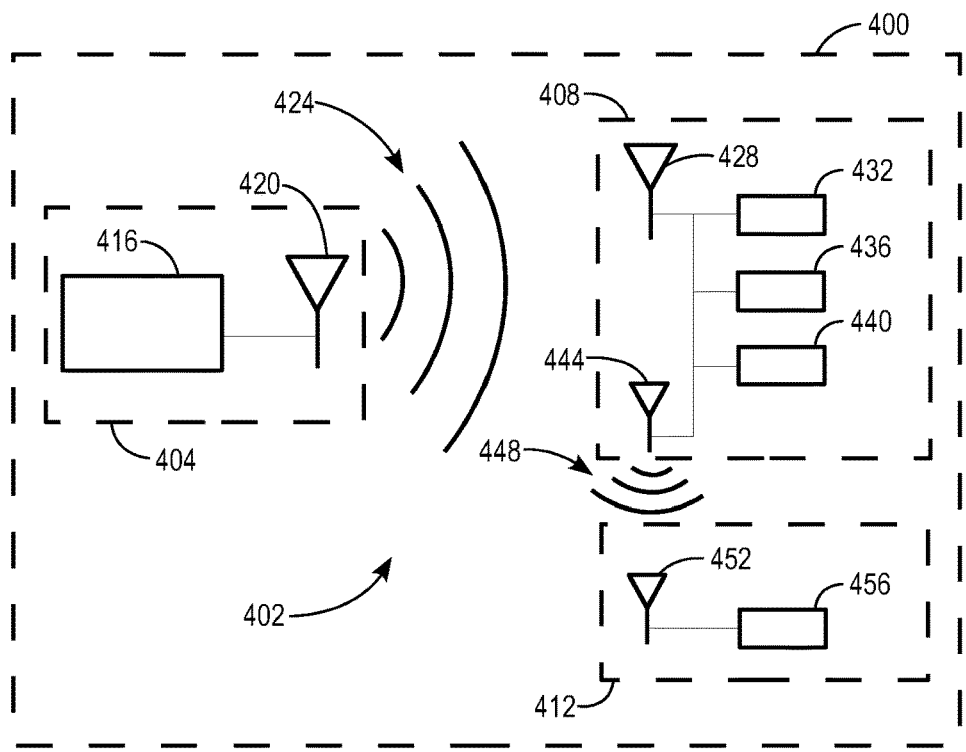
FIG. 3 is a schematic diagram of yet another vehicle equipped with a contactless power transfer system.

FIG. 3 is a schematic diagram of another contactless power system 402 for a vehicle 400. The vehicle 400 includes a power transmission system 404, a first seat 408, and a second seat 412. The power transmission system 404 has a battery 416 operatively connected to a near-field inductive loop power transmitting antenna 420. The near-field transmitting antenna 420 is positioned proximate to the first seat 408 and is configured to generate an electromagnetic field 424 encompassing at least a portion of the first seat 408.

The first seat 408 has a near-field inductive loop power receiving antenna 428 operatively connected to a motor 432, seat controls 436, a sensor 440, and a repeater antenna 444. The near-field receiving antenna 428 is located within the electromagnetic field 424 generated by the near-field power transmitting antenna 420 to enable the receiving antenna 428 to receive energy from the electromagnetic field 424. The receiving antenna 428 converts the energy received into usable power to enable the motor 432 to move the first seat 408. Additionally, the power enables operation of the controls 436 that control operation of the motor 432 and a sensor 440 that detects the presence of a person in the seat 408. The power produced by the near-field power receiving antenna 428 is retransmitted by the repeater antenna 444, which can be an inductive near-field loop or an RF far-field power transmission antenna. The repeater antenna 444 generates a second electromagnetic field 448 encompassing at least a portion of the second seat 412.

The second seat 412 includes a power receiving antenna 452 operatively connected to a sensor 456. The power receiving antenna 452 corresponds to the energy in the second electromagnetic field 448 generated by the repeater antenna 444 to enable the power receiving antenna 452 to receive energy from the second electromagnetic field 448. The receiving antenna 452 converts the energy from the second electromagnetic field 448 into usable power to operate the sensor 456 in the second seat 412.

Figure 4:
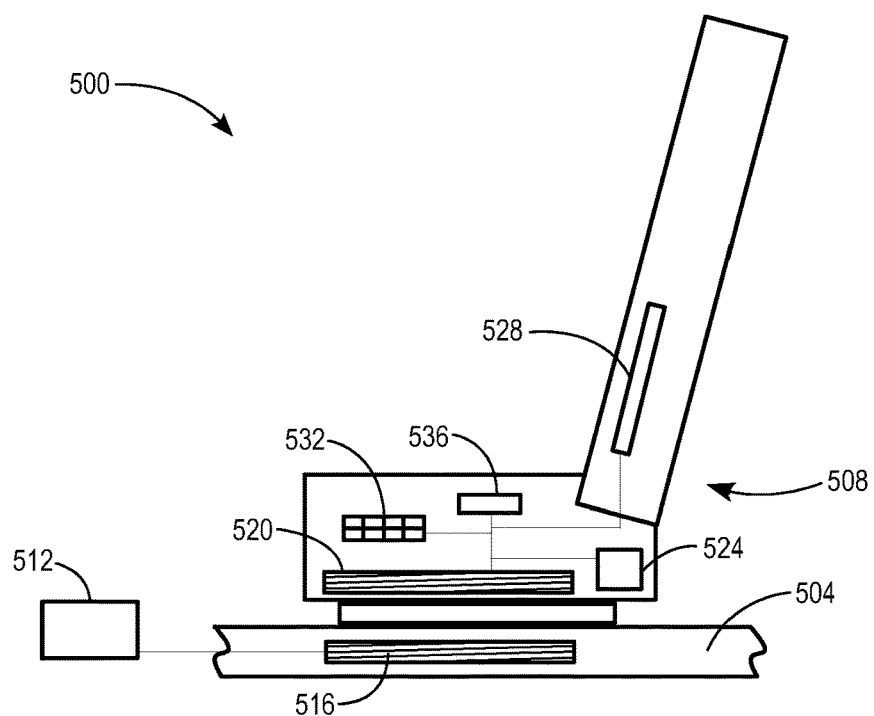
FIG. 4 is a schematic view of a seat in a vehicle equipped with a contactless power transfer system.

FIG. 4 is a schematic view of a vehicle 500 having a vehicle floor 504, a seat 508, and a power source 512. The power source 512 is operatively connected to a power transmitter 516 in the floor 504 of the vehicle body. The power transmitter 516 of the embodiment of FIG. 4 is an inductive loop oriented in a horizontal plane in the view of FIG. 4. The inductive power transmitter 516 generates an electromagnetic wave near-field directed at a lower portion of the seat 508 of the vehicle 500.

The seat 508 is supported by the floor 504 of the vehicle and includes an electromagnetic wave near-field power receiver 520 operatively connected to a motor 524, a heater 528, controls 532, and a sensor 536 within the seat. The power receiver 520 is oriented in a horizontal plane in FIG. 4, parallel to the plane in which the power transmitter 516 is located. Since the power receiver 520 and power transmitter 516 are positioned in close proximity to one another in parallel planes, the receiver 520 receives a substantial portion of the energy transmitted by the transmitter 516. The power receiver 520 is configured to receive energy from the electromagnetic field generated by the power transmitter 516 and convert the energy received into power. In other embodiments, the power receiver 520 can be configured to produce power from the energy received from the electromagnetic field. The power produced by the power receiver 520 is delivered by wires within the seat 508 to the motor 524 that positions and orients the seat 508 relative to the vehicle 500. Additionally, the power is delivered to a heater 528 for optionally warming the seat 508 when a driver or passenger is present in the seat 508. The power is further configured to power controls 532 located on an outer portion of the seat that control the operation of the motor 524 and the heater 528. In other embodiments, the controls for one or both of the motor and heater can be located in other locations in the vehicle, for example in the dash or on the console. The sensor 536 in the seat 508 is also operated by the power generated by the power receiver 516, and is configured to detect the presence of a driver or passenger in the seat 508. An electronic signal generated by the sensor in response to detecting the presence of an individual in the seat 508 is transmitted by known wireless signal transmission methods to a controller (not shown) of the vehicle 500. Consequently, no wires are required to connect the seat 508 to the body of the vehicle 500 and the seat 508 can thus be easily installed and removed.

Figure 5:
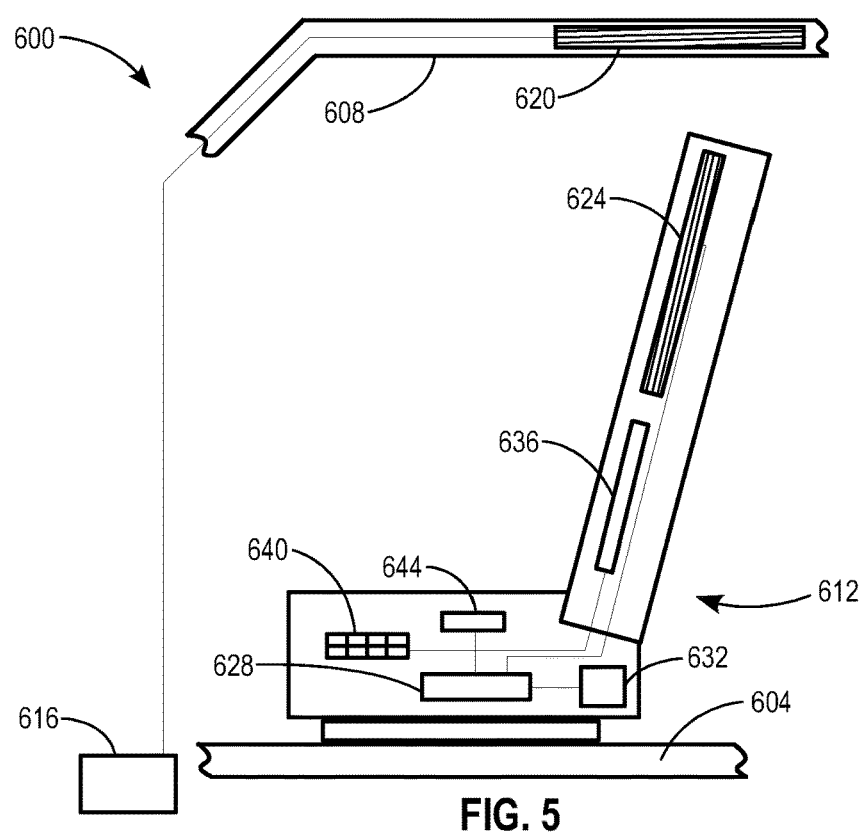
FIG. 5 is a schematic view of another seat in a vehicle equipped with a contactless power transfer system.

FIG. 5 is a schematic view of a vehicle 600 having a vehicle floor 604, vehicle ceiling 608, a seat 612, and a power source 616. The power source 616 is operatively connected to a power transmitter 620 located in the ceiling 608 of the vehicle body. The power transmitter 620 of the embodiment of FIG. 5 is an inductive loop oriented in a horizontal plane in the view of FIG. 5, above the seat 612. The inductive power transmitter 620 generates an electromagnetic wave near-field directed at an upper portion of the seat 612 of the vehicle 600.

The seat 612 is supported by the floor 604 of the vehicle and includes an electromagnetic wave near-field power receiver 624 in an upper portion of the seat 612 operatively connected to a battery 628 located within the seat. The power receiver 624 is oriented in a plane that is transverse to the plane in which the power transmitter 620 is located. When the transmitter 620 and receiver 624 are in transverse planes, the system is configured such that the receiver 624 receives sufficient power to charge the battery 628. The power receiver 624 is receives energy from the electromagnetic field generated by the power transmitter 620 and converts the energy into power. The power produced by the power receiver 624 is delivered by wires within the seat 612 to the battery 628, which stores the power for subsequent use. The battery 628 is operatively connected to and configured to deliver stored power to a motor 632 that positions and orients the seat 612 relative to the vehicle 600, a heater 636 for warming the seat 612, controls 640 that control the operation of the motor 632 and the heater 636, and a sensor 644 that detects the presence of a person in the seat 612. An electronic signal generated by the sensor 644 in response to detecting the presence of an individual in the seat 612 is transmitted by known wireless signal transmission methods to a controller (not shown) of the vehicle 600 such that no wires connect the seat 612 to the body of the vehicle 600.

Figure 6:
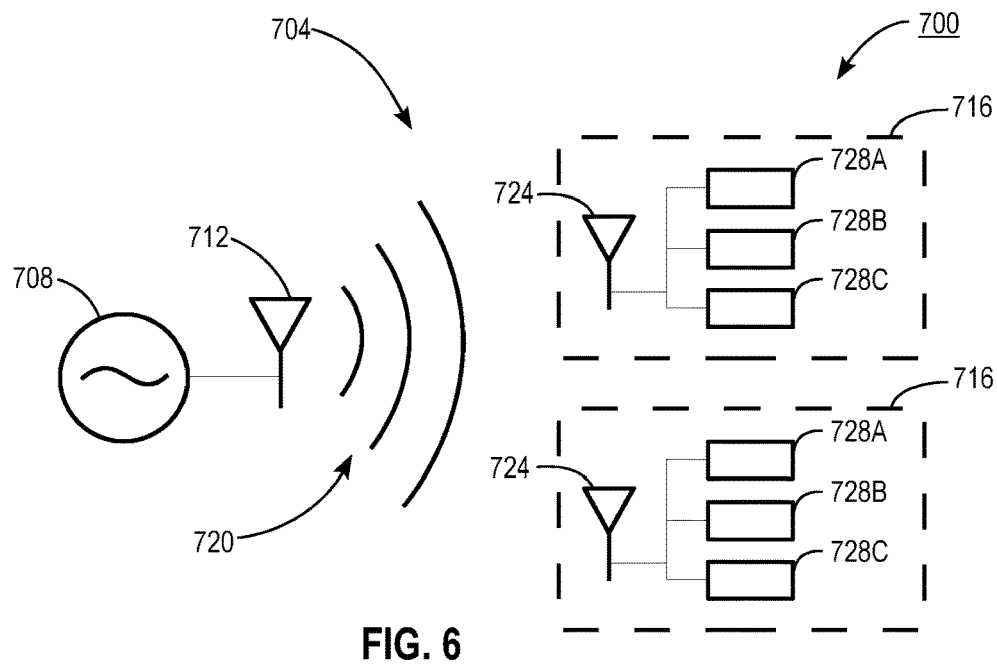
FIG. 6 is a schematic diagram of an assembly line having a contactless power transfer system.

FIG. 6 is a schematic diagram of an assembly line 700 having a contactless power testing system 704. The assembly line 700 includes a power source 708, a wireless power transmitter 712, and a plurality of devices being manufactured on the assembly line 700, of which two devices 716 are shown in FIG. 6. The power source 708 is operatively connected to the wireless power transmitter 712 to deliver electrical power to the wireless power transmitter 712. In the embodiment of FIG. 6, the power source 708 is an AC power source, for example a fixed connection to the power of the building in which the assembly line 700 is located. In other embodiments, other sources of power can be used to operate the wireless power transmitter 712, such as a battery or an electric generator.

The wireless power transmitter 712 is configured to use the power received from the power source 708 to generate an electromagnetic field 720. The wireless power transmitter 712 can be an inductive loop configured to generate an electromagnetic near-field, an RF antenna configured to generate an electromagnetic far-field, a light source, or any other source of suitable electromagnetic energy. The type of power transmitter 712 and the electromagnetic field 720 produced by the power transmitter 712 can be selected based on the amount of power required to test the devices 716 on the assembly line and the distance over which the power must be transmitted.

Each of the devices 716 on the assembly line 700 has a wireless power receiver 724 operatively connected to electronic components 728A, 728B, and 728C. The devices 716 can be auto parts in a vehicle assembly line, parts for consumer electronics, industrial parts, or any other parts that are manufactured on an assembly line. The electronic components 728A-C can be any component within the device 716 that requires electrical power to be tested, for example various sensors, lights, motors, speakers, circuit boards, and any other electronic apparatus. Further, although the devices 716 of FIG. 6 are depicted having three electronic components 728A-C, in other embodiments devices having any number of electronic components can be tested during assembly. The wireless power receiver 724 is configured to receive energy from the electromagnetic field 720 produced by the wireless power transmitter 712 and convert the energy received into usable power. The power generated is then delivered to the electronic components 728A-C to power the electronic components 728A-C and enable the electronic components 728A-C to be tested prior to connecting a permanent source of electrical power to the device 716.

In one embodiment, the wireless power receiver 724 is configured to be attached to the electronic components 728A-C immediately prior to testing the device 716 to enable wireless testing of the electronic components 728A-C in the device. After the electronic components 728A-C are tested, the wireless power receiver 724 is removed from the device 716, and can be subsequently reused on another device 716. In another embodiment, the wireless power receiver 724 is permanently installed in the device 716, enabling the device 716 to receive wirelessly transmitted power during normal operation after the device 716 is completely assembled.

In assembly line 700, the power source 708 and power transmitter 712 can be configured as a mobile unit, to enable the power transmitter 712 to be transported proximate to the devices 716 being tested as the devices 716 remain in a fixed position. In another embodiment, the power transmitter 712 is fixed, for example in a floor, ceiling, wall, or other structure, and the devices 716 are transported through the electromagnetic field 724 generated by the power transmitter 712 as the devices 716 move along the assembly line 700. The devices can be stopped within the electromagnetic field during testing of the electronics therein, or the electronic components can be tested as the devices move through the electromagnetic field and while other components are installed on the devices to improve production efficiency and increase the design flexibility of the assembly process.

Figure 7:
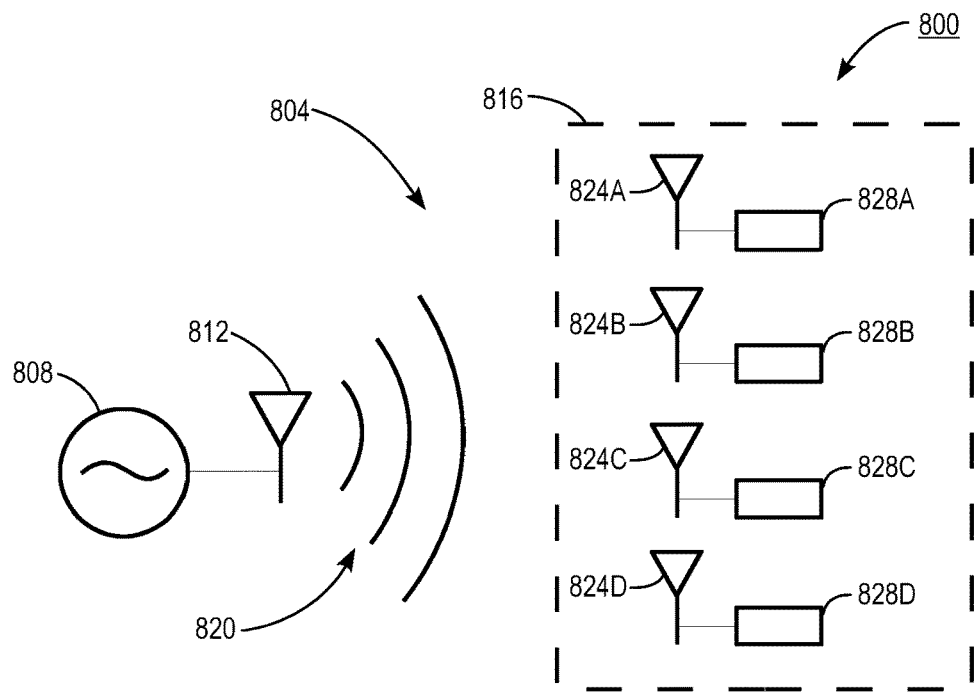
FIG. 7 is a schematic diagram of an assembly line having a contactless power transfer system.

FIG. 7 is a schematic diagram of another assembly line 800 having a contactless power testing system 804. The assembly line 800 includes a power source 808, a wireless power transmitter 812, and a plurality of devices being manufactured on the assembly line 800, of which one device 816 is shown in FIG. 7. The power source 808 is operatively connected to the wireless power transmitter 812 to supply electrical power to the wireless power transmitter 812.

The wireless power transmitter 812 is configured to use the power received from the power source 808 to generate an electromagnetic field 820. The wireless power transmitter 812 can be an inductive loop configured to generate an electromagnetic near-field, an RF antenna configured to generate an electromagnetic far-field, a light beam, or any other transmitter that generates a suitable electromagnetic energy field. The power transmitter 812 and the electromagnetic field 820 produced by the transmitter 812 can be selected based on the power required to test the devices 816 on the assembly line.

Each of the devices 816 on the assembly line 800 has a plurality of wireless power receivers 824A, 824B, 824C, and 824D, each of which is operatively connected to one electronic component 828A, 828B, 828C, and 828D, respectively. The electronic components 828A-D can be any component within the device 816 that requires electrical power, for example various sensors, lights, motors, speakers, circuit boards, and any other electronic apparatuses. The wireless power receivers 824A-D are each configured to receive energy from the electromagnetic field 820 produced by the wireless power transmitter 812 and convert the energy received into usable power. The power received by the power receivers 824A-D is then delivered to the electronic components 828A-D to operate the electronic components 828A-D for testing prior to connecting a permanent source of electrical power to the device 816.

Figure 8:
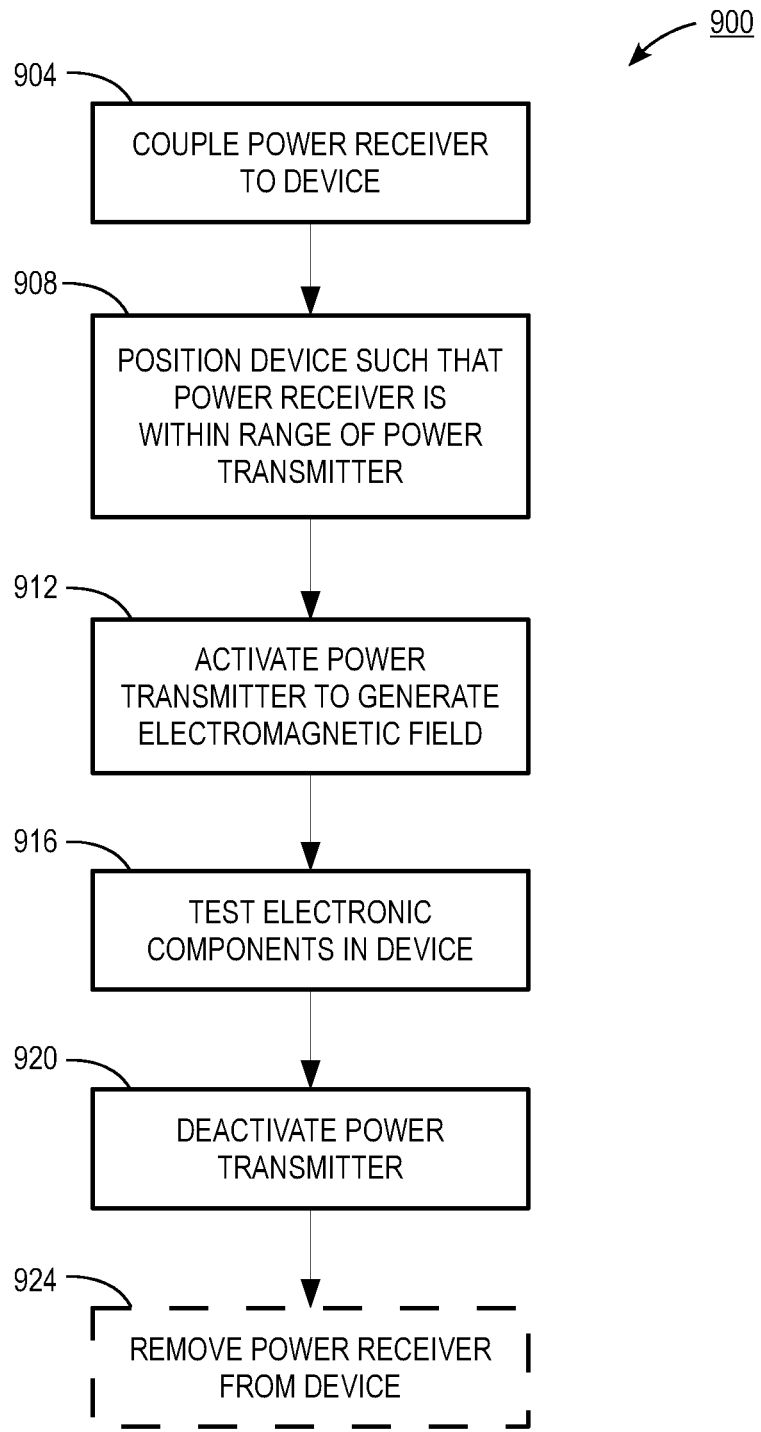
FIG. 8 is a flow diagram of a process for testing a device on an assembly line using a contactless power transfer system.

FIG. 8 is a flow diagram of a process for wirelessly powering devices to test electronic components on an assembly line. First, a wireless power receiver is coupled to the device being tested (block 904). The wireless power receiver can be an inductive loop electromagnetic near-field receiver, a RF electromagnetic far-field antenna, or any other suitable receiver, depending on the power requirements for the electronic components in the device and the power transmitter in the system. The device is then positioned such that the power receiver is within an electromagnetic field generated by the power transmitter (block 908). In some embodiments, the device can be positioned within range of the power transmitter (block 908) prior to coupling the power receiver to the device (block 904).

Once the power receiver is coupled to the device and the device is positioned within range of the power transmitter, the power transmitter is activated to generate an electromagnetic field (block 912). The power receiver receives energy from the electromagnetic field and converts the energy into usable power, which is used to power the electronic components in the device. Once the electronic components are powered, the electronic components are tested for defects and other faults (block 916). In some embodiments, the electronic components are tested by an automated system, while in other embodiments the electronic components are tested manually by a worker on the assembly line. After the electronic components have been tested, the power transmitter is turned off, deactivating the electromagnetic field (block 920). In some embodiments, the power receivers are removed from the device after the electronic components are tested (block 924). In other embodiments, however, the power receivers remain coupled to the device and the electronic components such that the devices can be operated using wireless power in subsequent testing and during normal operation of the device.

A contactless power system for a vehicle also has the ability to share or transfer power between one or more vehicles, from a vehicle to another object, or to a vehicle from an external power source, under certain circumstances.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A system for powering components in a seat of a vehicle comprising:
a vehicle body;
a power transmitter supported by the vehicle body and operatively connected to a vehicle power supply, the power transmitter including a far-field transmitting antenna configured to generate an electromagnetic field;
the seat supported by the vehicle body;
a first power receiver located in the seat within the electromagnetic field and operatively connected to at least one component in the seat, the first power receiver including a first far-field receiving antenna configured to receive energy from the electromagnetic field, the first power receiver configured to generate electrical power from the energy received by the first far-field receiving antenna and deliver the electrical power to the at least one component; and
a second power receiver located in the seat within the electromagnetic field and operatively connected to at least one additional component in the seat, the second power receiver including a second far-field receiving antenna configured to receive energy from the electromagnetic field, the second power receiver configured to generate additional electrical power from the energy received by the second far-field receiving antenna and deliver the additional electrical power to the at least one additional component.

2. The system of claim 1, wherein the seat includes a battery supported in the seat and operatively connected to the first power receiver.

3. The system of claim 1, wherein:
the power transmitter is positioned below the seat in a floor of the vehicle body; and
the first power receiver is positioned in a lower portion of the seat proximate to the power transmitter.

4. The system of claim 1, wherein:
the power transmitter is positioned above the seat in a ceiling of the vehicle body; and
the first power receiver is positioned in an upper portion of the seat proximate to the power transmitter.

5. A vehicle comprising:
a power source;
a power transmitter operatively connected to the power source to receive electrical energy from the power source, the power transmitter including a far-field transmitting antenna configured to generate an electromagnetic field;
a first seat having: (i) a first power receiver including a first far-field receiving antenna located within the electromagnetic field and configured to receive energy from the electromagnetic field, the first power receiver configured to generate electrical power from the energy received by the first far-field receiving antenna, and (ii) at least one component operatively connected to the first power receiver to receive the electrical power generated by the first power receiver; and
a second seat having: (i) a second power receiver including a second far-field receiving antenna located within the electromagnetic field and configured to receive energy from the electromagnetic field, the second power receiver configured to generate additional electrical power from the energy received by the second far-field receiving antenna, and (ii) at least one additional component operatively connected to the second power receiver to receive the additional electrical power generated by the second power receiver,
wherein the first seat further comprises:
a third power receiver located within the electromagnetic field and configured to generate further electrical power from the electromagnetic field; and
at least one further component operatively connected to the third power receiver to receive the further electrical power generated by the third power receiver.

6. The vehicle of claim 5 wherein:
the first seat includes a battery supported in the first seat and operatively connected to the first power receiver; and
the second seat includes a second battery supported in the second seat and operatively connected to the second power receiver.

7. The vehicle of claim 5, the at least one component in the first seat comprising:
a sensor configured to generate an electronic signal in response to detecting a person in the first seat.

* * * * *